(12) United States Patent
Davis

(10) Patent No.: US 8,896,374 B2
(45) Date of Patent: Nov. 25, 2014

(54) ENERGY SOURCE SHARING

(75) Inventor: Roy Howard Davis, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 51 days.

(21) Appl. No.: 13/558,137

(22) Filed: Jul. 25, 2012

(65) Prior Publication Data

US 2014/0028390 A1    Jan. 30, 2014

(51) Int. Cl.
*H03G 3/20* (2006.01)

(52) U.S. Cl.
USPC .......................................... 330/127; 330/295

(58) Field of Classification Search
USPC ........... 330/124 R, 127, 295, 297; 455/127.1, 455/127.3, 127.5, 572
See application file for complete search history.

(56) References Cited

U.S. PATENT DOCUMENTS

| | | | | |
|---|---|---|---|---|
| 5,945,941 A * | 8/1999 | Rich et al. | ....................... | 330/297 |
| 7,969,121 B2 | 6/2011 | Smith et al. | | |
| 8,193,864 B2 * | 6/2012 | Model | ........................... | 330/297 |
| 8,542,061 B2 * | 9/2013 | Levesque et al. | ............. | 330/127 |

| | | | |
|---|---|---|---|
| 2009/0206772 A1 | 8/2009 | Bayer et al. | |
| 2011/0198929 A1 | 8/2011 | Zhu et al. | |
| 2012/0146731 A1 * | 6/2012 | Khesbak | ....................... 330/295 |

FOREIGN PATENT DOCUMENTS

| | | |
|---|---|---|
| EP | 2200148 A2 | 6/2010 |
| EP | 2360808 A1 | 8/2011 |
| EP | 2360809 A1 | 8/2011 |
| JP | 2010004692 A | 1/2010 |

OTHER PUBLICATIONS

Sahu, et al., "A High-Efficiency Linear RF Power Amplifier With a Power-Tracking Dynamically Adaptive Buck-Boost Supply," IEEE Transactions on Microwave Theory and Techniques, Vol. 52, No. 1, Jan. 2004, pp. 112-120.
Habler F., et al., "Analysis of buck-converters for efficiency enhancements in power amplifiers for wireless communication", Microwave and Optoelectronics Conference, 2007, IMOC 2007, SBMO/IEEE M TT-S International, IEEE, PI, Oct. 29, 2007, pp. 616-620, XP031223454, ISBN 978-1-4244-0660-9.
International Search Report and Written Opinion—PCT/US2013/052124—ISAEPO—Dec. 6, 2013.

* cited by examiner

*Primary Examiner* — Khanh V Nguyen

(57) ABSTRACT

Exemplary embodiments are directed to devices and methods for sharing an energy storage element within an electronic device. A device may include a plurality of transmit paths. The device may further include a voltage supply including an energy storage element coupled to each transmit path of the plurality of transmit paths.

25 Claims, 8 Drawing Sheets

ENERGY SOURCE SHARING

BACKGROUND

1. Field

The present invention relates generally to electronic devices. More specifically, the present invention relates to sharing a single energy storage element among multiple functionalities of an electronic device.

2. Background

As will be understood by a person having ordinary skill in the art, an electronic device, such as a wireless communication device, may have multiple radios for providing voice and data links, peer-to-peer (P2P) networks, wireless local area networks (WLAN), and audio amplifiers. Further, conventional electronic devices may have a dedicated voltage source for each power amplifier, audio amplifier, and electronic flash of a high pixel count camera. This leads to duplication of expensive circuit elements to maintain isolation between circuits. Further, components (e.g., power amplifier, camera flash LED and a class D audio amplifier) of a typical wireless terminal device require high power in short bursts. There is a need for devices and methods to reduce the power supply complexity required to support components of an electronic device.

DETAILED DESCRIPTION

Figure 1:
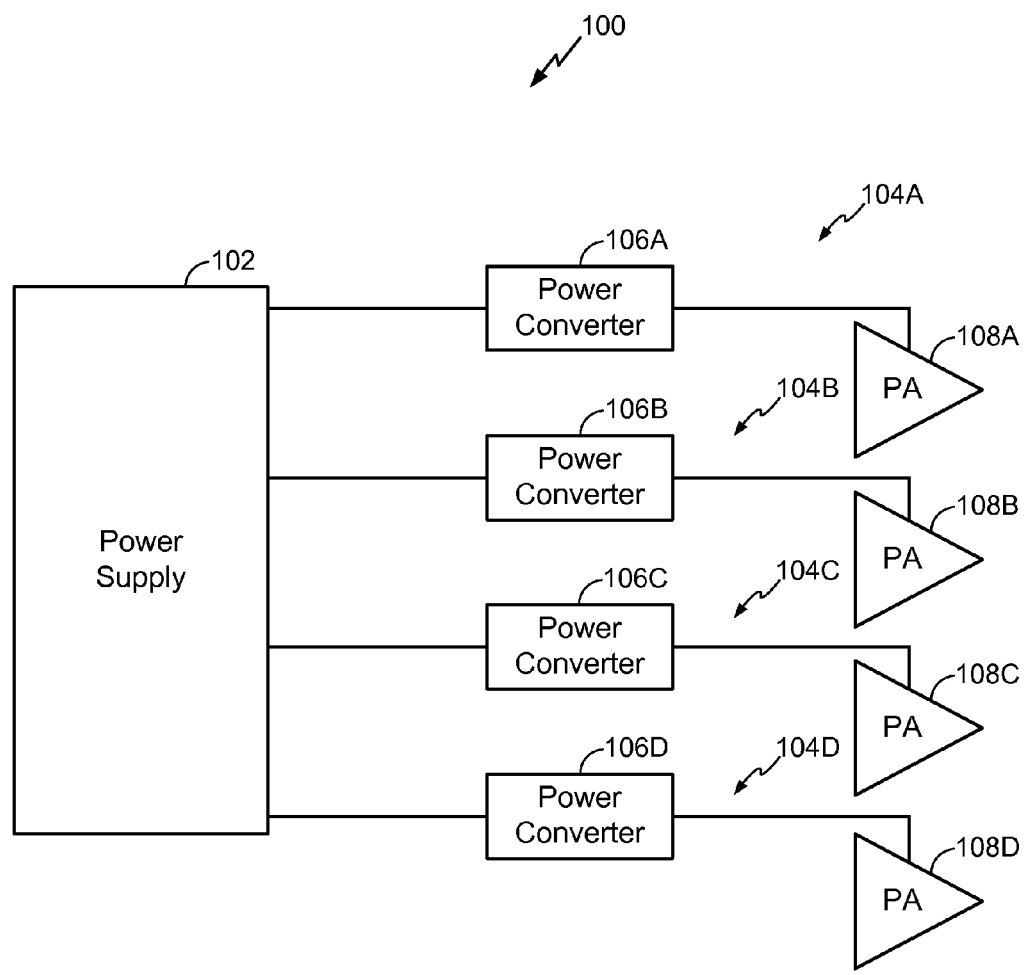
FIG. 1 is a block diagram of an electronic device including a power supply coupled to a plurality of transmit paths.

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

As noted above, an electronic device may communicate on multiple frequency bands simultaneously. Further, as communications require more bursts of power, transmitting at higher power for short durations of time may be desired. This requires that the power supply in the electronic device be capable of providing peak currents to multiple radio transmitters. In addition, functionality is becoming more parallel, where a voice connection and one or more data connections may exist simultaneously. More specifically, an electronic device (e.g., a wireless communication device) may include a plurality of radios for simultaneously providing voice and data links, P2P and WLAN, audio amplifiers, and an electronic flash. A battery of an electronic device may comprise a variable voltage source with high equivalent series resistance (ESR) and, as a result, the varying current draw may cause the voltage at the battery terminals to vary. Further, high current draw during a burst of radio energy representing a data packet would draw down the battery voltage, which then recovers upon completion of the packet burst. This causes the design of power supplies for high current functional blocks to be complex in order to generate a stable voltage rail, or lower performance when the rail is allowed to vary. The ESR of the battery may allow the voltage to vary considerably with current draw. It is often necessary for the voltage from the battery to be stabilized by a boost/buck converter that boosts the voltage when the current draw is heavy and bucks (i.e., reduces) the voltage when the current draw is low and the battery is fully charged. As understood by a person having ordinary skill in the art, boost/buck converters are typically more complex than a boost converter or a buck converter.

As also noted above, because conventional electronic devices may include dedicated voltage sources for each amplifier and electronic flash, duplication of expensive circuit elements may be required to maintain isolation between circuits. Powering high current circuit blocks directly off a battery and absorbing the degradation in performance from a high ESR source is not preferred.

FIG. 1 illustrates an electronic device 100 including a power supply (e.g., a battery) 102 and a plurality of transmit paths 104A-104D. As illustrated, each transmit path 104A-104D includes a dedicated power converter 106A-106D and a dedicated power amplifier 108A-108D. Conventionally, each power converter 106A-106D comprises a boost-buck converter configured to receive a voltage of, for example, 3.5-4.2 volts from power supply 102 and convey a supply voltage to an associated power amplifier 108A-108D. The supply voltage, which may vary from, for example, 2-4 volts, may follow an envelope of the power required by the associated power amplifier for the associated signal conditions. The use of dedicated power converters for each transmit path is not ideal. Further, utilizing a boost-buck converter for envelope following requires a complex switch-mode converter for each power amplifier and, therefore, is also not ideal.

Figure 2:
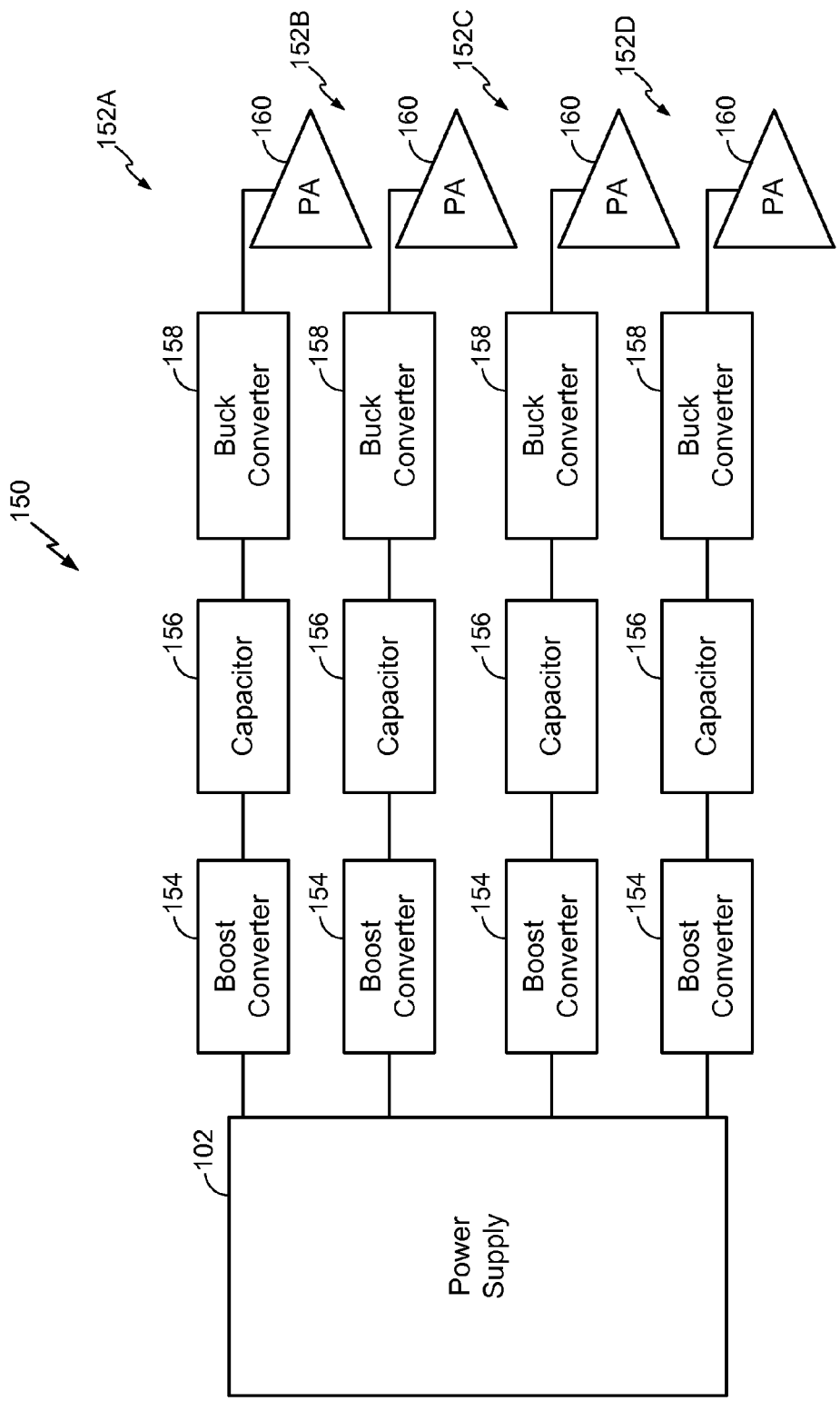
FIG. 2 is a block diagram of a device including a plurality of transmit paths, wherein each transmit path includes separate boost and buck converters, according to an exemplary embodiment of the present invention.

FIG. 2 illustrates a device 150 including a plurality of transmit paths 152A-152B. Each transmit path 152 includes a boost power converter 154, a conventional capacitor (e.g., an electrolytic capacitor) 156, a buck converter 158, and a power amplifier 160. It is noted that in comparison to device 100 illustrated in FIG. 1, the buck and boost converters of device 150 are separate elements.

As will be appreciated by a person having ordinary skill in the art, envelope tracking (ET) involves constantly adjusting a supply voltage applied to a power amplifier so that the amplifier is always operating at maximum efficiency. Envelope tracking power amplifiers may require their DC supply to be modulated with a signal synchronous and time aligned with the magnitude of the RF signal that is being amplified. When the RF signal level is high, the DC supply voltage must be at maximum to deliver the peak power. When the RF signal level is low, the DC supply voltage may be lowered to reduce power dissipation. This method can significantly improve the efficiency of the power amplifier. Accordingly, in one exemplary embodiment, buck converter 158 may include a buck envelope following converter configured to generate a supply voltage that follows an envelope of the RF signal conveyed to an associated power amplifier 160. Therefore, an efficiency of power amplifier 160 may be improved. It is noted that an envelope of a baseband signal may used to predict an envelope of the RF signal conveyed to power amplifier power amplifier 160.

Various embodiments of the present invention include methods and devices for sharing an energy storage element among various components of an electronic device, such as a wireless communication device. For example, the energy storage element may be shared by two power amplifiers. Further, the energy storage element may supply power to one or more audio amplifiers, an electronic flash (e.g., a camera flash), or both. More specifically, according to one exemplary embodiment, a device may include a plurality of transmit paths and a single voltage source. The voltage source may include an energy storage device (e.g., an electric double-layer capacitor (EDLC)), which may be coupled to each transmit path of the plurality of transmit paths. Another exemplary embodiment comprises a method, which includes supplying a voltage from an energy storage device (e.g., an electric double-layer capacitor (EDLC)) to each of a first power amplifier and a second power amplifier.

Figure 3:
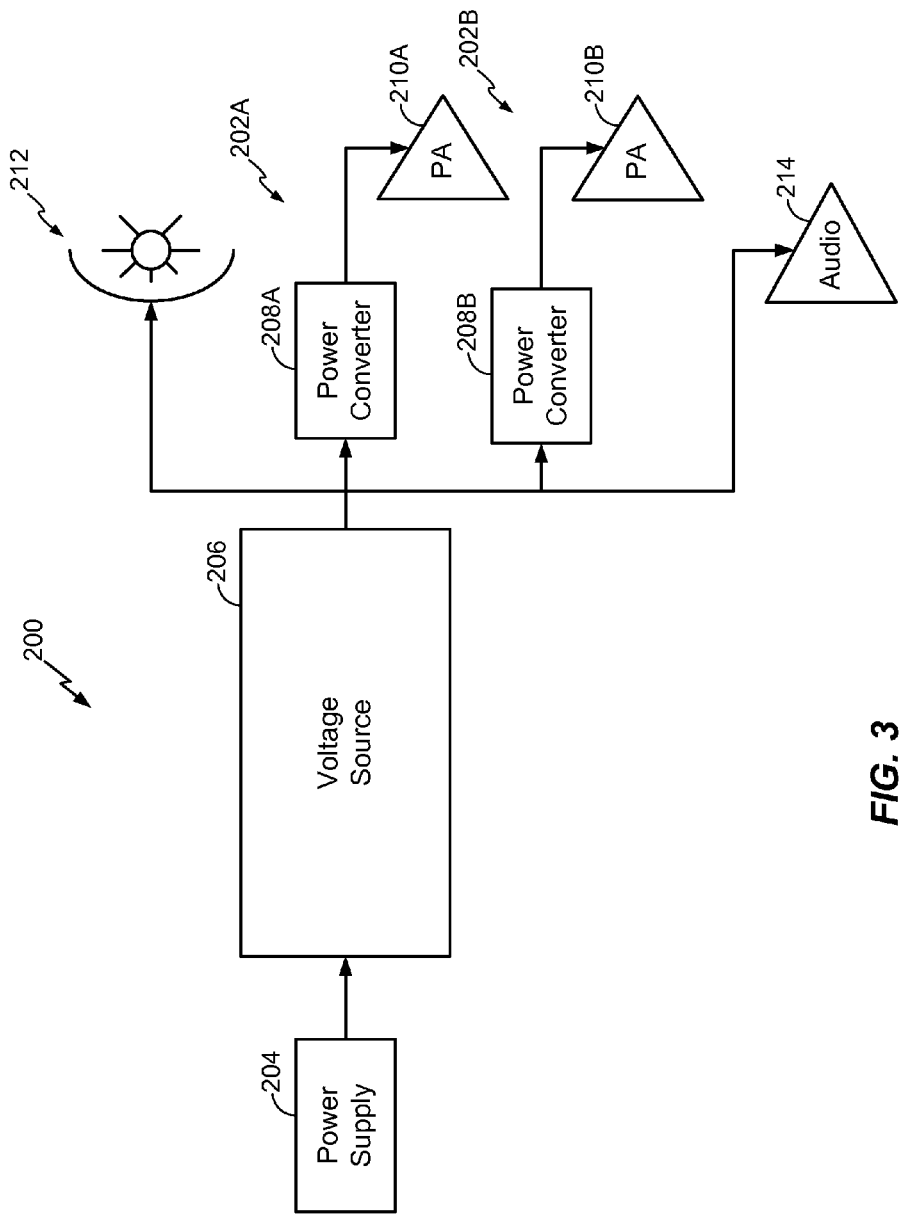
FIG. 3 is a block diagram of a device including a plurality of components configured for sharing a single energy storage element, according to an exemplary embodiment of the present invention.

FIG. 3 illustrates a device 200, in accordance with an exemplary embodiment of the present invention. Device 200 includes power supply 204 coupled to a voltage source 206. For example only, power supply 204 comprises a battery. As a more specific example, power supply 204 may comprise a Lithium-ion battery having a voltage rail of substantially 3.5 to 4.2 volts. As described more fully below, voltage source 206 may comprise, for example only, a low ESR electrolytic capacitor or an EDLC.

Device 200 further includes a plurality of transmit paths 202A-202B coupled to voltage source 206. Although device 200 includes only two transmit paths, the invention is not so limited. Rather, device 200 may include any number of transmit paths. According to one exemplary embodiment, each transmit path 202 includes a power converter and a power amplifier. For example, as illustrated in FIG. 3, power amplifier path 202A includes power converter 208A and power amplifier 210A. Similarly, power amplifier path 202B includes power converter 208B and power amplifier 210B. By way of example only, each power converter (i.e., power converter 202A and power converter 202B) comprises a buck envelope converter, which may also be referred to as a "buck envelope following converter." Although the power amplifier and power converter of a transmit path are illustrated as separate components, the power amplifier and power converter of a transmit path may be included together within a single component.

Device 200 may further include an electronic flash 212, such as, for example only, an electronic camera LED flash. Moreover, device 200 may include an audio amplifier 214, which may comprise, for example, a class D audio amplifier. It is noted that although device 200, as illustrated, only includes one electronic flash and one audio amplifier, the invention is not so limited. Rather, device 200 may include a plurality of electronic flashes and a plurality of audio amplifiers.

An electric double-layer capacitor (EDLC), which is also known as supercapacitor, supercondenser, electrochemical double layer capacitor, or ultracapacitor, is an electrochemical capacitor with relatively high energy density. As will be understood by a person having ordinary skill in the art, an EDLC may accumulate electric energy using charges accumulated in an electrochemical double layer formed in an interface between a solid electrode and an electrolyte. The EDLC includes an electrode, a separating film, an electrolyte, and a case. An important element in the EDLC is an electrode material used for the electrode. Since the electrode material needs to have a great electric conductivity and specific surface, and to be electrochemically stable, activated carbon or activated fiber is mostly widely used.

In comparison to conventional capacitors, EDLCs have high capacitance in relation to their volume and weight. There are two main reasons for these volumetric and weight efficiencies. First, the charge separation layers are very narrow. Their widths are typically on the order of nanometers. Second, the electrodes can be made from a porous material, having a very large effective surface area per unit volume. Because capacitance is directly proportional to the electrode area and inversely proportional to the widths of the charge separation layers, the combined effect of the large effective surface area and narrow charge separation layers is a very high capacitance in comparison to conventional capacitors of similar size and weight. High capacitance of EDLCs may allow the capacitors to receive, store, and release a large amount of electrical energy. As non-limiting examples, a EDLC may have a capacitance of substantially 1,200,000 uF, store a voltage of approximately 5.5 volts, and exhibit a 50 milla ohm (0.05 ohm) ESR.

Figure 4:
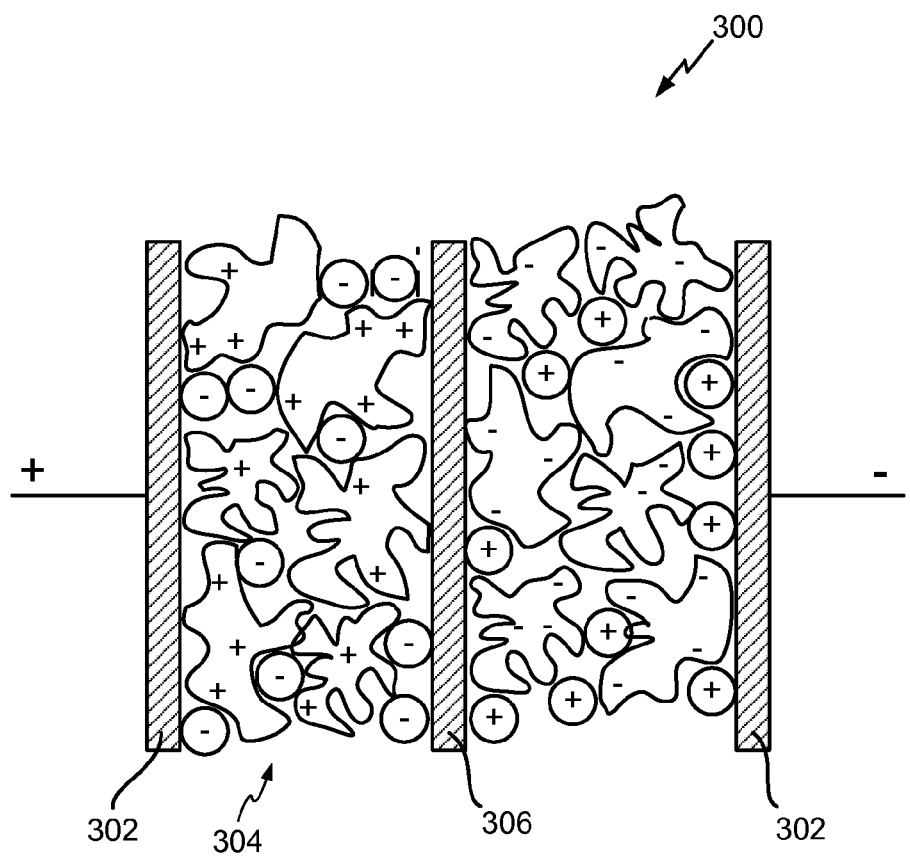
FIG. 4 illustrates an example of an electrochemical double-layer capacitor that may be used in various exemplary embodiments of the present invention.

An example of an electrochemical double-layer capacitor (EDLC) 300 is illustrated in FIG. 4. EDLC 300 includes electrodes 302, activated carbon 304, and a separator 306. For a number of reasons EDLCs are gaining popularity in many energy storage applications. The reasons include availability of EDLCs with high power densities (in both charge and discharge modes), and with energy densities approaching those of conventional rechargeable batteries. Further, EDLCs have a relatively short charging time.

EDLCs had progressed to the point that a single component may store enough energy to supply peak current needs for many milliseconds and the effective series resistance (ESR) is very low, providing a "stiff" voltage source (i.e., when a pulse of current is drawn of the super cap, the voltage drops a minimal amount). Moreover, if the voltage in a conventional battery (e.g., lithium battery) drops below a certain point (e.g., 3.2 volts), the battery may not have enough energy to sustain high current pulses. In contrast to a conventional circuit configuration, it may be possible to drain a battery further down (e.g., well below 3.2 volts) if an EDLC is used as an intermediate energy storage. Therefore, it may be possible to get more energy out of the battery. However, application of dedicated EDLC to a single transmitter path may not make economical sense due to the expensive nature of an EDLC.

Figure 5:
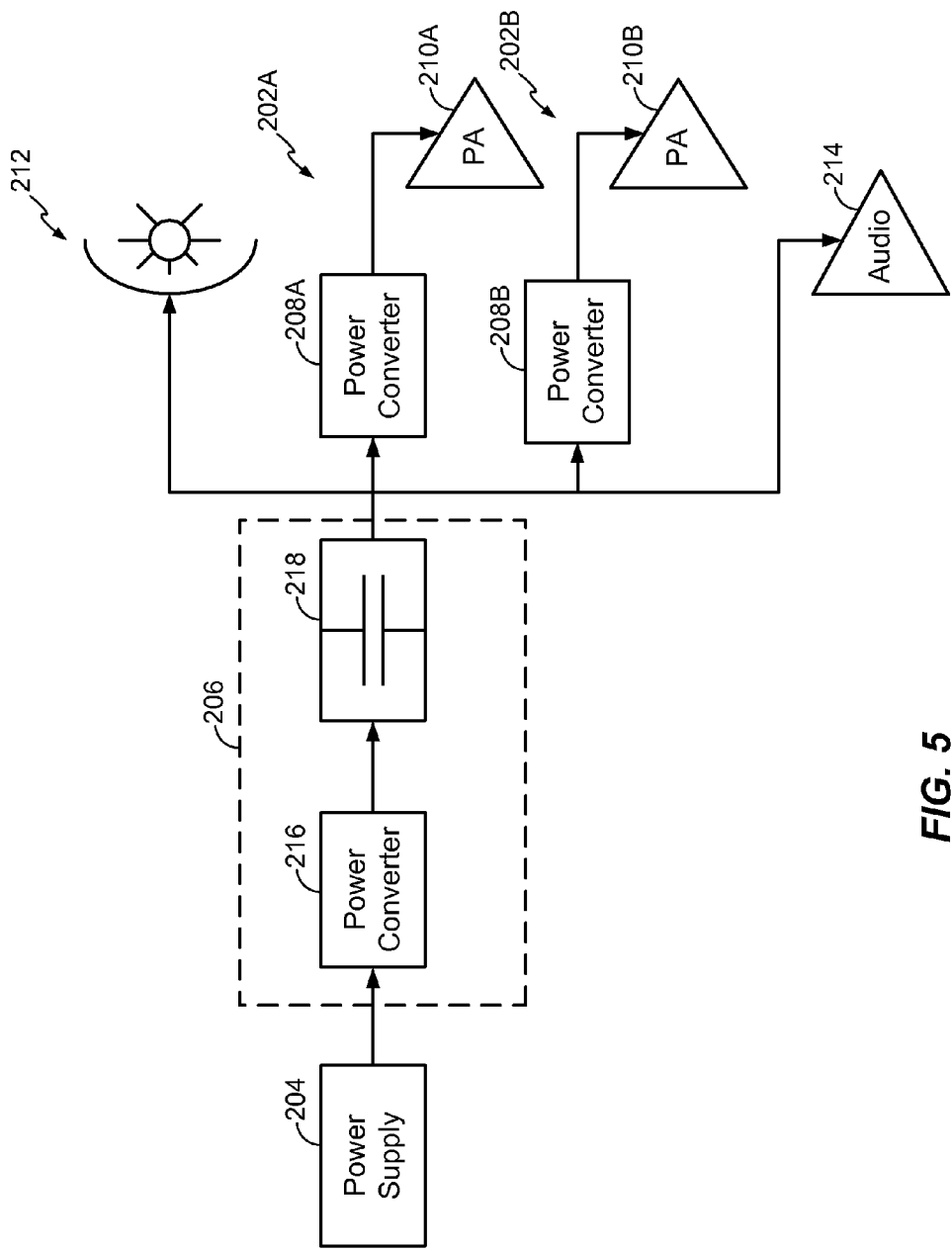
FIG. 5 is a detailed block diagram of a device including a plurality of components configured for sharing a single energy storage element, in accordance with an exemplary embodiment of the present invention.

With reference to FIG. 5, according to one exemplary embodiment of the present invention, voltage source 206 comprises a power converter 216 coupled to an energy storage element 218. According to one exemplary embodiment, energy storage element 218 may comprise an electric double-layer capacitor (EDLC). By way of example only, power converter 216 may comprise a boost converter, which may be configured to charge energy storage element 218 to a substantially constant voltage in the range of substantially 4 to 5 volts. It is noted that energy storage element 218 may be charged to a voltage that is higher than a voltage of power supply 204. As will be appreciated by a person having ordinary skill in the art, energy storage element 218 may have relatively high energy density compared to a conventional electrolytic capacitor. Energy storage element 218 may also be referred to herein as a "supercapacitor" or an "ultracapacitor." It is noted that some EDLCs may have a maximum voltage in the range of 2.7 volts. Therefore, it may be required to stack at least two EDLCs to achieve a desired voltage.

As described herein, a single low ESR energy storage element may be shared by multiple components (i.e., multiple power amplifiers, one or more audio amplifiers, and an electronic flash (e.g., a camera flash)). It is noted that a single boost converter need only deliver the average current required by the components. Stated another way, power converter 216 does not need to be sized for the simultaneous peak of each component, or potentially not even the peak of one component as the current peaks are smoothed out by energy storage element 218.

Further, because the components (i.e., power amplifiers 210A and 210B, audio amplifier 214, and/or electronic flash 212) are not relying on power supply 204 for large current pulses, power may be drawn from power supply 204 (e.g., a battery) at a slower rate (e.g., a trickle charge). Accordingly, energy of power supply 204 may be drawn down further, without bottoming out. In addition, because power supply 204 is not providing large current pulses, a more accurate measurement of remaining life of power supply 204 may be more easily determined. In addition, because an electronic flash and an audio amplifier may be supplied by a common energy storage element and can depend on a "stiff" voltage supply, the designs of each of electronic flash 212 and audio amplifier 214 may be simplified. Further, because EDLCs may have a relatively low ESR, interaction of "bursty," high power components may be reduced. However, it is noted that proper circuit board layout and attention to current return paths may still be necessary to avoid substantial interaction between the components.

Figure 6:
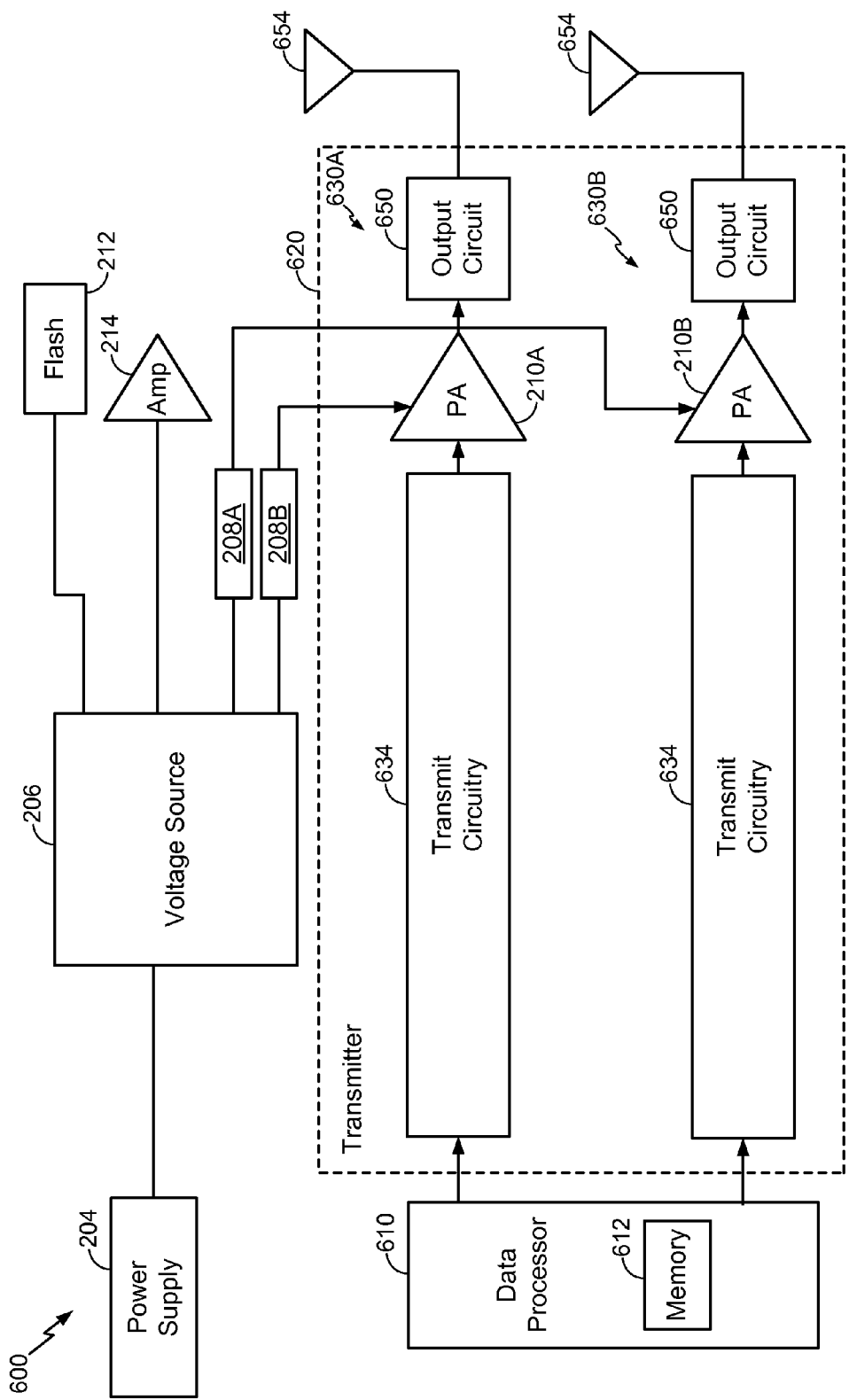
FIG. 6 illustrates a system including a plurality of components configured for sharing a single energy storage element, in accordance with an exemplary embodiment of the present invention.

FIG. 6 shows a block diagram of an exemplary design of a wireless communication device 600. In this exemplary design, wireless communication device 600 includes a data processor 610 and a transceiver 620 that support bi-directional wireless communication. In addition to receive circuitry (not shown), transceiver 620 includes a first transmit path 630A and a second transmit path 630B. As illustrated, each transmit path includes transmit circuitry 634 coupled to an input of an associated power amplifier (PA) 210. Further, an output of each power amplifier 210A and 210B is coupled to an associated output circuit 650, which is further coupled to an associated antenna 654.

As will be appreciated by a person having ordinary skill in the art, transmit circuitry 634 may include various amplifiers and filters, and a mixer configured to upconvert a signal from baseband to radio frequency (RF). Transmit circuitry 634 may also include a phase locked loop (PLL) and a local oscillator (LO) generator for generating and providing LO signals to the mixer. More specifically, within a transmit path, an analog output signal may be amplified by an amplifier, filtered by a lowpass filter to remove images caused by digital-to-analog conversion, amplified by a variable gain amplifier, and upconverted from baseband to radio frequency (RF) by a mixer. The upconverted signal is filtered by another filter to remove images caused by the frequency upconversion. The signal may then be amplified by power amplifier (PA) 210 to obtain the desired output power level, routed through output circuit 650, and transmitted via antenna 654. Output circuit 650 may perform impedance matching, signal switching, filtering, and/or other functions, as will be understood by a person having ordinary skill in the art. In general, wireless device 600 may include any number of transmit paths for any number of communication systems and any number of frequency bands.

Data processor 610 may perform various functions for wireless device 600 (e.g., processing for transmitted and received data). A memory 612 may store program codes and data for data processor 610. Data processor 610 may be implemented on one or more application specific integrated circuits (ASICs) and/or other ICs.

Wireless communication device 600 may support communication with multiple wireless communication systems utilizing different radio technologies. These radio technologies may be based on Code Division Multiple Access (CDMA), Time Division Multiple Access (TDMA), Frequency division Multiple Access (FDMA), Orthogonal FDMA (OFDMA), etc. For example, wireless device 600 may support CDMA 1X and/or Wideband CDMA (WCDMA) as well as Global System for Mobile Communications (GSM). Wireless device 100 may also support other radio technologies such as Long Term Evolution (LTE), wireless local area network (WLAN), Bluetooth, etc. For clarity, much of the description below assumes that wireless device 600 supports CDMA (e.g., CDMA 1X and/or WCDMA) and GSM.

GSM is a TDMA radio technology that employs time division duplexing (TDD). For TDD, the downlink and uplink share a single frequency channel and are allocated different time intervals on the frequency channel. Switches are typically used to route an output RF signal from a transmit path of transmitter 620 to antenna 654 and to route a received RF signal from antenna 654 to a receiver (not shown). CDMA 1X and WCDMA are two CDMA radio technologies that employ frequency division duplexing (FDD).

Figure 7:
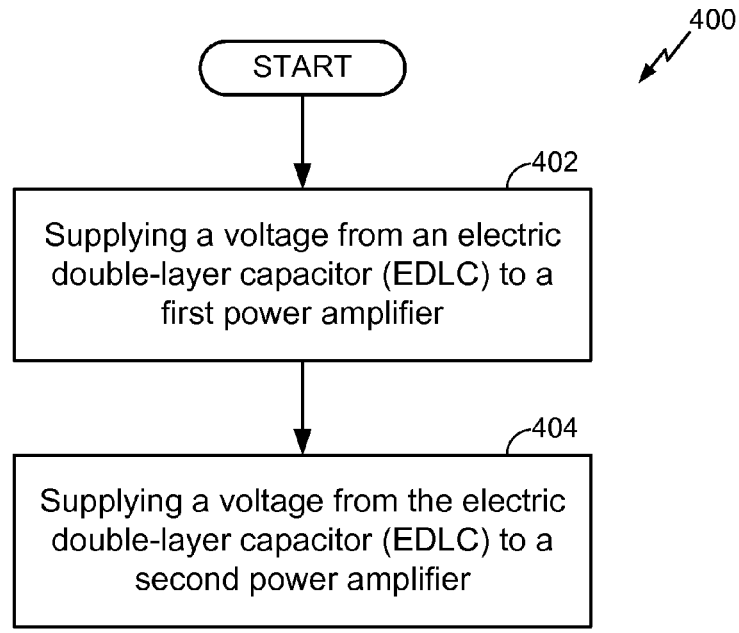
FIG. 7 is a flowchart illustrating a method, according to an exemplary embodiment of the present invention.

FIG. 7 is a flowchart illustrating a method 400, in accordance with one or more exemplary embodiments. Method 400 may include supplying a voltage from an electric double-layer capacitor (EDLC) to a first power amplifier (depicted by numeral 402). For example, with reference to FIG. 5, a voltage may be supplied from EDLC 218 to power amplifier 210A via power converter 208A. Method 400 may also include supplying a voltage from the electric double-layer capacitor (EDLC) to a second power amplifier (depicted by numeral 404). For example, with reference again to FIG. 5, a voltage may be supplied from EDLC 218 to power amplifier 210B via power converter 208B. According to another exemplary embodiment, EDLC 218 may supply a voltage to electronic flash 212, audio amplifier 214, or both.

Figure 8:
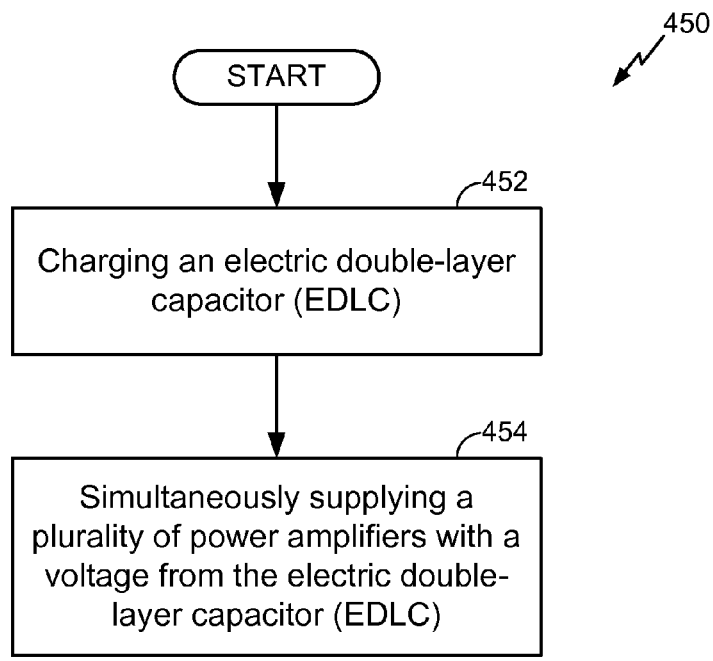
FIG. 8 is a flowchart illustrating another method, according to an exemplary embodiment of the present invention.

FIG. 8 is a flowchart illustrating another method 450, in accordance with one or more exemplary embodiments. Method 450 includes charging an electric double-layer capacitor (EDLC) (depicted by numeral 452). By way of example, with reference to FIG. 5, EDLC 218 may be charged via power supply 204 and power converter 216. Further, method 450 may include supplying a plurality of power amplifiers with a voltage from the electric double-layer capacitor (EDLC) (depicted by numeral 454). For example, with reference again to FIG. 5, a voltage may be supplied from EDLC 218 to each of power amplifier 210A (i.e., via power converter 208A) and power amplifier 210B (i.e., via power converter 208B).

Figure 9:
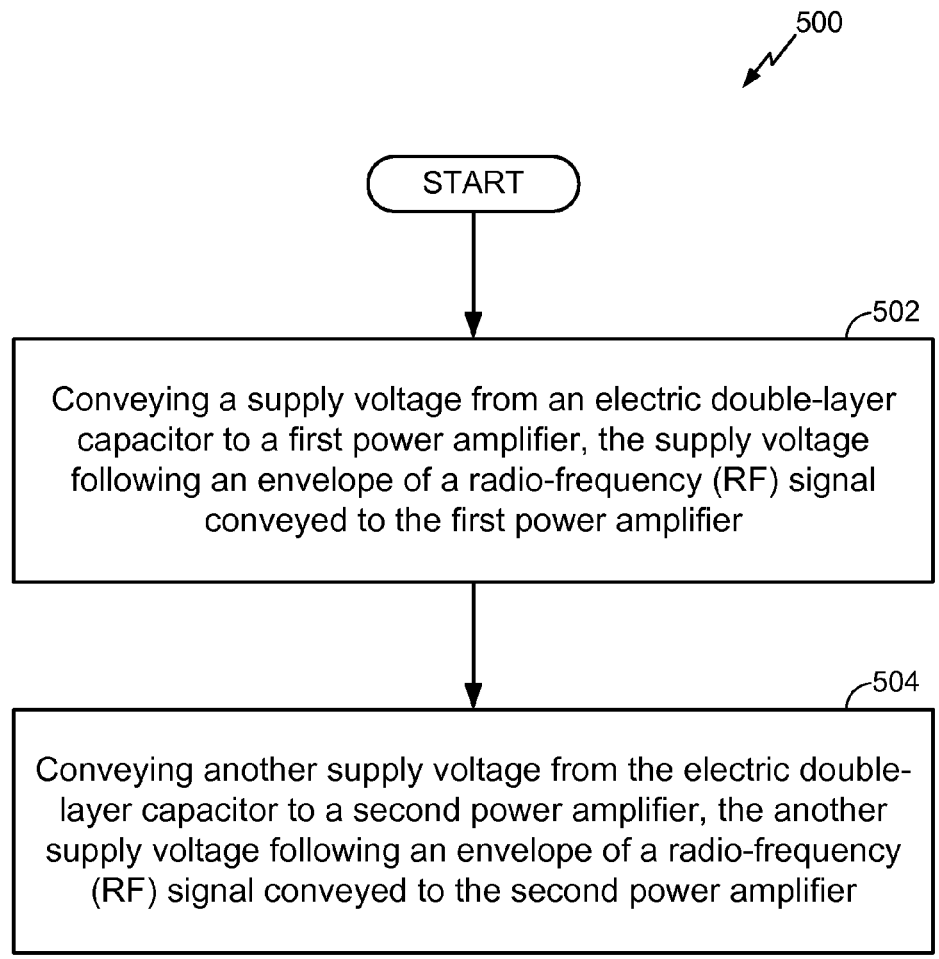
FIG. 9 is a flowchart illustrating yet another method, according to an exemplary embodiment of the present invention.

FIG. 9 is a flowchart illustrating a method 500, in accordance with one or more exemplary embodiments. Method 500 may include conveying a supply voltage from an electric double-layer capacitor to a first power amplifier, the supply voltage following an envelope of a radio-frequency (RF) signal conveyed to the first power amplifier (depicted by numeral 502). Method 500 may also include conveying another supply voltage from the electric double-layer capacitor to a second power amplifier, the supply voltage following an envelope of a radio-frequency (RF) signal conveyed to the second power amplifier (depicted by numeral 504).

As described herein, exemplary embodiments of the present invention are directed to sharing a single energy storage element between multiple power consuming components of an electronic device, such as a wireless communication device. In comparison to conventional devices, exemplary embodiments may include an EDLC with a relatively low ESR and, therefore, the EDLC may be shared between circuits without interaction amongst the circuits. Further, in comparison to conventional devices, a number of circuits may be decreased and the complexity of a voltage source may be simplified.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the exemplary embodiments shown herein but is to be accorded the widest scope consistent with the principles and novel features disclosed herein.

What is claimed is:

1. A device, comprising:
a plurality of transmit paths; and
a voltage source including a power converter and an energy storage element coupled to and shared by each transmit path of the plurality of transmit paths, the power converter configured to supply average current required by the plurality of transmit paths and the energy storage element configured to supply peak current required by the plurality of transmit paths.

2. The device of claim 1, wherein the power converter is a boost converter.

3. The device of claim 1, each transmit path of the plurality of transmit paths including a buck converter configured as a buck envelope following converter coupled to a power amplifier.

4. The device of claim 1, further comprising at least one of an audio amplifier and electronic flash coupled to the voltage source.

5. The device of claim 1, the energy storage element comprising an electric double-layer capacitor (EDLC).

6. A device, comprising:
a first power amplifier;
at least a second power amplifier; and
a voltage supply including a power converter and an electric double-layer capacitor (EDLC) and configured for simultaneously supplying a voltage to each of the first power amplifier and the at least a second power amplifier, the power converter configured to supply average current required by the power amplifiers and the EDLC configured to supply peak current required by the power amplifiers.

7. The device of claim 6, wherein the power converter is a boost converter for coupling to a power source.

8. The device of claim 6, the first power amplifier coupled to buck converter configured as a first buck envelope following converter and the at least a second power amplifier coupled to a second buck envelope following converter.

9. The device of claim 6, further comprising an electronic flash and an audio amplifier coupled to the voltage supply.

10. The device of claim 6, further comprising a battery coupled to the voltage supply.

11. A device, comprising:
a voltage supply including a power converter coupled to an electric double-layer capacitor (EDLC); and
a plurality of components configured to receive a voltage from the voltage supply, at least two of the plurality of components comprising a power amplifier, the power converter configured to supply average current required by the power amplifiers and the EDLC configured to supply peak current required by the power amplifiers.

12. The device of claim 11, the plurality of components comprising at least one of an electronic flash and an audio amplifier.

13. A method, comprising:
receiving a voltage from a power converter;
supplying the voltage from an electric double-layer capacitor (EDLC) to a first power amplifier; and
supplying the voltage from the electric double-layer capacitor (EDLC) to a second power amplifier, the power converter configured to supply average current required by the power amplifiers and the EDLC configured to supply peak current required by the power amplifiers.

14. The method of claim 13, further comprising supplying a voltage from the electric double-layer capacitor (EDLC) to at least one of an electronic flash and an audio amplifier.

15. The method of claim 13, further comprising charging the electric double-layer capacitor with a voltage from a battery.

16. The method of claim 15, further comprising boosting the voltage from the battery to charge the electric double-layer capacitor.

17. A method, comprising:
charging an electric double-layer capacitor (EDLC) from a power converter; and
simultaneously supplying a plurality of power amplifiers with a voltage from the electric double-layer capacitor (EDLC), the power converter configured to supply average current required by the plurality of power amplifiers and the EDLC configured to supply peak current required by the plurality of power amplifiers.

18. The method of claim 17, further comprising supplying at least one of an electronic flash and an audio amplifier with a voltage from the electric double-layer capacitor (EDLC).

19. The method of claim 17, further comprising boosting a battery voltage to charge the electric double-layer capacitor (EDLC).

20. The method of claim 17, the supplying the plurality of power amplifiers with a voltage comprising:
supplying the voltage from the electric double-layer capacitor (EDLC) to a first buck converter coupled to an input of a first power amplifier of the plurality of power amplifiers; and
supplying the voltage from the electric double-layer capacitor (EDLC) to a second buck converter coupled to an input of a second power amplifier of the plurality of power amplifiers.

21. A method, comprising:
receiving a supply voltage from a power converter;
conveying the supply voltage from an electric double-layer capacitor to a first power amplifier, the supply voltage following an envelope of a radio-frequency (RF) signal conveyed to the first power amplifier; and
conveying the supply voltage from the electric double-layer capacitor to a second power amplifier, the power converter configured to supply average current required by the power amplifiers and the electric double-layer capacitor configured to supply peak current required by the power amplifiers.

22. A device, comprising:
means for receiving a voltage from a power converter;
means for supplying the voltage from an electric double-layer capacitor (EDLC) to a first power amplifier; and
means for supplying the voltage from the electric double-layer capacitor (EDLC) to a second power amplifier, the power converter configured to supply average current required by the power amplifiers and the EDLC configured to supply peak current required by the power amplifiers.

23. The device of claim 22, further comprising means for supplying a voltage from the electric double-layer capacitor (EDLC) to at least one of an electronic flash and an audio amplifier.

24. A device, comprising:
means for charging an electric double-layer capacitor (EDLC) from a power converter; and
means for simultaneously supplying a plurality of power amplifiers with a voltage from the electric double-layer capacitor (EDLC), the power converter configured to supply average current required by the plurality of power amplifiers and the EDLC configured to supply peak current required by the plurality of power amplifiers.

25. The device of claim 24, further comprising means for boosting a battery voltage to charge the electric double-layer capacitor (EDLC).

* * * * *